(12) United States Patent
Yamada et al.

(10) Patent No.: US 7,482,092 B2
(45) Date of Patent: Jan. 27, 2009

(54) POLYMER BATTERY HAVING THE OUTER PERIPHERIES OF THE SEPARATOR AND NEGATIVE ELECTRODE POSITIONED OUTSIDE OF AN OUTER PERIPHERY OF THE POSITIVE ELECTRODE

(75) Inventors: Kazuo Yamada, Nara (JP); Motoaki Nishijima, Nara (JP); Naoto Nishimura, Kashihara (JP); Naoto Torata, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 607 days.

(21) Appl. No.: 10/733,762

(22) Filed: Dec. 12, 2003

(65) Prior Publication Data

US 2005/0031947 A1 Feb. 10, 2005

(30) Foreign Application Priority Data

Dec. 13, 2002 (JP) .............................. 2002-362788

(51) Int. Cl.
  *H01M 2/08* (2006.01)
  *H01M 2/18* (2006.01)
(52) U.S. Cl. ...................... 429/122; 429/129
(58) Field of Classification Search .............. 429/122, 429/129
  See application file for complete search history.

(56) References Cited

U.S. PATENT DOCUMENTS 4,303,748 A    12/1981  Armand et al.
4,547,440 A    10/1985  Hooper et al.
4,589,197 A     5/1986  North
5,415,954 A *   5/1995  Gauthier et al. ............... 429/94
6,120,930 A *   9/2000  Rouillard et al. .............. 429/66
6,869,723 B2 *  3/2005  Yamaguchi ................... 429/94

FOREIGN PATENT DOCUMENTS

JP        11-204137 A      7/1999
JP        2000-030742      1/2000
JP        2000-133312 A    5/2000
JP        2001-6741 A      1/2001

* cited by examiner

*Primary Examiner*—Mark Ruthkosky
(74) *Attorney, Agent, or Firm*—Nixon & Vanderhye, P.C.

(57) ABSTRACT

A polymer battery having at least one layer of a positive electrode, at least one layer of a polymer electrolyte retained by a separator and at least one layer of a negative electrode, each of which is in a thin film form, stacked in this order, wherein the entirety of the outer peripheries of the separator and of the negative electrode is positioned outside of the outer periphery of the positive electrode except for a collector tab (49 provided to the positive electrode so as to protrude from one side of the positive electrode, and the following relationship is satisfied in a portion of the outer peripheries of the separator and of the negative electrode: the length between the end of the negative electrode and the end of the positive electrode (D1) >the length between the end of the negative electrode and the end of the separator (D2).

16 Claims, 1 Drawing Sheet

POLYMER BATTERY HAVING THE OUTER PERIPHERIES OF THE SEPARATOR AND NEGATIVE ELECTRODE POSITIONED OUTSIDE OF AN OUTER PERIPHERY OF THE POSITIVE ELECTRODE

CROSS-REFERENCE TO RELATED APPLICATIONS

This application is related to Japanese Patent Application No. 2002-362788 filed on Dec. 13, 2002 whose priority is claimed under 35 USC § 119, the disclosure of which is incorporated by reference in its entirety.

BACKGROUND OF THE INVENTION

1. Field of the Invention

The present invention relates to a lithium polymer battery and a manufacturing method for the same and, more particularly, to a stacked type lithium polymer battery and a manufacturing method for the same.

2. Description of the Related Art

Matrix materials such as carbon materials and conductive polymers which utilize a dope-undope process of lithium ions instead of utilizing lithium metal or metal alloy thereof for a negative electrode have been developed in recent years. Accordingly, generation of dendrite (which occurs in the case where lithium metal or metal alloy thereof is utilized) no longer theoretically occurs. Therefore, short circuit problems inside of the battery has been considerably reduced. In particular, it is known that the dope-undope potential of lithium of carbon materials is closer to the deposition-dissolution potential of lithium than that of other materials. Specifically, graphite materials are carbon materials that can theoretically hold lithium in their crystal lattice at a rate of one lithium atom relative to six carbon atoms and which have a high capacity per unit weight and per unit volume. Furthermore, the potential of intercalation-deintercalation of lithium is flat in graphite materials which are chemically stable so as to greatly contribute to the cycle stability of batteries.

As a result of such research and development, a so-called lithium ion battery employing a carbon material as the negative electrode has been commercialized and has rapidly come into wide use as a power source for mobile devices. Such battery is lightweight and has a high capacity which is utilized to the fullest.

In addition, ion conductive polymers having high ion conductivities have been recently reported. Research has been directed to increase the prevention of liquid leakage, the safety level, and the extended shelf life of batteries in the case where liquid electrolytes are used.

Normal (straight) chain polymers, net crosslinked polymers and comb polymers of homopolymers or copolymers having basic units of ethylene oxides have, in particular, been proposed and have been put into practice as one group of ion conductive polymers. Batteries using ion conductive polymers in which electrolytic salts are dissolved in high polymer materials having such polyether structures have been widely described in patent documents (see, for example, U.S. Pat. Nos. 4,303,748, 4,589,197 and 4,547,440).

These ion conductive polymers, however, have low ion conductivities at a temperature below room temperature; therefore, reduction in size and weight and an increase in the energy density required for batteries for power sources to drive portable electronic devices and to back up memories cannot be implemented.

Therefore, a method for achieving an increase in the ion conductivities of these ion conductive polymers has been proposed. According to the proposed method, a monomer and an organic solvent (in particular, organic solvent having a high dielectric constant such as ethylene carbonate (EC) and propylene carbonate (PC)) are mixed so as to be polymerized and, thereby, a gel polymer electrolyte (hereinafter, referred to as "chemical crosslinked gel") is obtained which maintain an electrolytic solution in a polymer network and which maintains a solid condition. The chemical crosslinked gel can greatly reduce the risk of liquid leakage. Therefore, it has become possible to utilize a laminate film wherein a metal foil and a resin film are stacked as an exterior material of batteries.

Manufacturing methods for such batteries are generally categorized into "stacked types" of manufacturing batteries (by stacking groups of electrodes) and "jelly-roll (winding) types" of manufacturing batteries (by winding positive electrodes, negative electrodes and separators in band forms).

So far, the mainstream of lithium ion batteries is the "jelly-roll types" of manufacturing batteries wherein positive electrodes, negative electrodes and separators are wound in band forms in order to emphasis importance on the productivity because the forms of batteries are restricted by the battery cans. On the other hand, it is easy to process the forms of lithium polymer batteries wherein laminate films are used as exterior materials. Therefore, manufacturing methods can freely be selected in order to achieve further reduction in weight and further freedom in the forms in addition to reductions in weight and increases in the capacity of lithium ion batteries and, for example, a stacked type can be adopted so that thin batteries having large areas can easily be manufactured.

In the case where polymer batteries are actually manufactured, the jelly-roll types are in the mainstream because facilities and manufacturing methods used for the manufacturing of conventional lithium ion batteries can be effectively utilized and the productivity is high. Accordingly, in the case where mechanization of production of polymer batteries are progressed for jelly-roll type batteries, only the batteries having similar forms to lithium ion batteries can ultimately be obtained due to the regulation of winding equipment for winding and peripheral jigs (the width of electrodes, winding core, and the like).

On the other hand, stacked type batteries in general have high freedom in form and have characteristics suitable for thin batteries, while mechanization of production is difficult due to the complication of their stacking processes. Although regulation of the sizes of positive electrodes, negative electrodes, and separator layers for separating between the positive electrodes and the negative electrodes has been proposed in order to increase the reliability (see, for example, Japanese Unexamined Patent Publication No. 2000-30742), the separator layers are set at sizes sufficiently larger than the positive electrodes and the negative electrodes in order to prevent short circuiting of the respective electrodes. Therefore, the problem of the complication of the stacking process is not solved. In addition, although there is an idea that separators are made to have a uniform size and both the positive and negative electrodes are covered with the separators so that the positioning can be easily carried out, a problem arises wherein the thickness of the battery increases and the energy density is reduced when the two electrodes are covered with the separators.

Furthermore, thin batteries having broad areas have problems that the batteries swell when gas is generated from the inside and that the batteries are weak against vibration in comparison with jelly-roll type batteries due to independence of electrodes.

BRIEF SUMMARY

A thin type polymer battery intrinsic to a stacked type structure and has a high freedom of forms so as to be converted to a variety of forms and, has high safety, productivity and reliability.

A polymer battery has at least one layer of a positive electrode, at least one layer of a polymer electrolyte retained by a separator, and at least one layer of a negative electrode, each of which is in a thin film form, stacked in this order. The entirety of the outer peripheries of the separator and of the negative electrode is positioned outside of the outer periphery of the positive electrode except for a collector tab provided to the positive electrode so as to protrude from one side of the positive electrode. The following relationship is satisfied in a portion of the outer peripheries of the separator and of the negative electrode: the length between the end of the negative electrode and the end of the positive electrode (D1) >the length between the end of the negative electrode and the end of the separator (D2).

Furthermore, a manufacturing method is provided for the above polymer battery, stacked in this order. The manufacturing method comprises the steps of:

processing the positive electrode, the separator and the negative electrode such that the entirety of the outer peripheries of the separator and the negative electrode is positioned outside of the outer periphery of the positive electrode except for a collector tab, which is provided to the positive electrode so as to protrude from one side of the positive electrode, at the time when the positive electrode, the separator and the negative electrode are stacked; and using jigs having means for determining the positions of electrodes in at least two places and, thereby, stacking the positive electrode, the polymer electrolyte ratained by the separator and the negative electrode so as to satisfy the following relationship in a portion of the outer peripheries of the separator and of the negative electrode: the length between the end of the negative electrode and the end of the positive electrode (D1)>the length between the end of the negative electrode and the end of the separator (D2).

DETAILED DESCRIPTION

Figure 1:
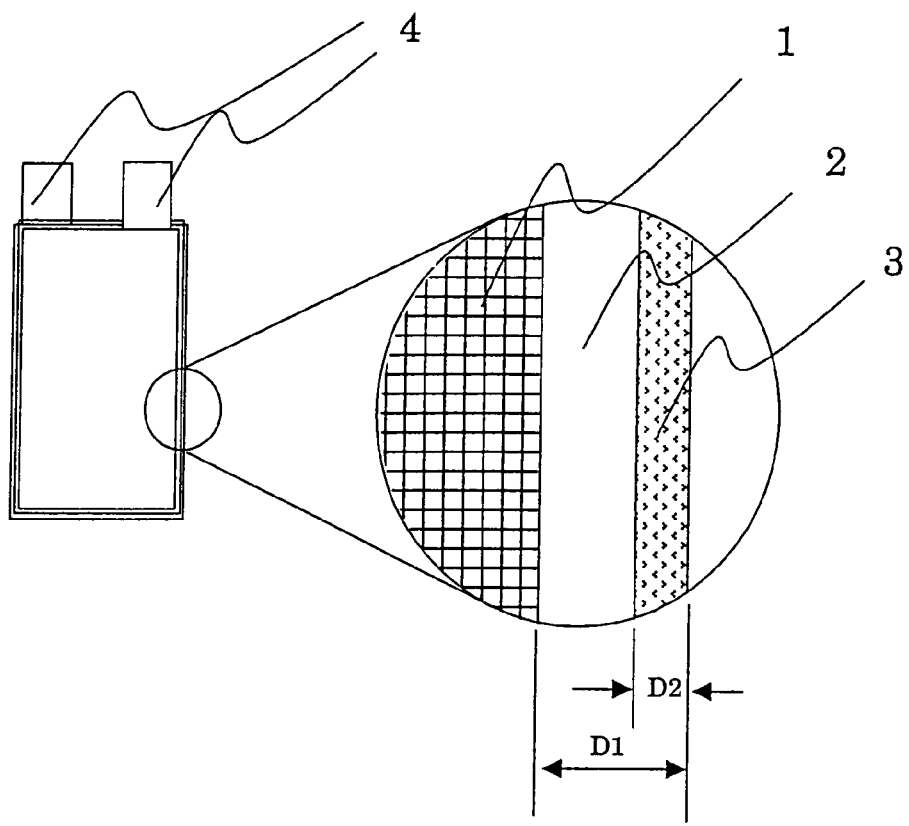
FIG. 1 is a schematic plan view of a main portion for describing the positional relationship between a positive electrode, a polymer electrolyte retained by a separator and a negative electrode of a polymer battery according to an example embodiment.

A polymer battery according to the an example embodiment has a configuration in that a positive electrode, a polymer electrolyte retained by a separator, and a negative electrode, each of which is in a thin film form, are stacked in this order.

It is preferable for the polymer battery according to the present embodiment to be conventionally referred to as a lithium polymer battery. However, it may not be limited to a lithium polymer battery but rather may be another type of a polymer battery.

An oxide that contains lithium can be used as a positive electrode active substance in a positive electrode, and specific examples thereof may include $LiCoO_2$, $LiNiO_2$, $LiFeO_2$, $LiMnO_2$, $LiMn_2O_4$ and substances obtained by replacing these transition metals with other metal elements.

In particular, $LiCoO_2$ and $LiMn_2O_4$ are preferable from the point of view of their capacities and stability of the cycle characteristics, and $LiCoO_2$ is more preferable. It is preferable for these materials to have average grain diameters from 5 to 50 μm, more preferably from 5 to 20 μm, from the point of view of gas generation suppression. In addition, it is preferable to use a material having a small specific surface area and it is preferable for the material to have a specific surface area of, for example, 3 $m^2/g$ or less and, more preferably 1 $m^2/g$ or less. In addition, in the case where $LiCoO_2$ is used as a positive electrode, it is preferable for the Li/Co ratio to be 1±0.05, more preferably to be 1±0.03, and still more preferably to be in a range from 0.95 to 1. Such a material is mixed with a known conductive material, a binding material and a given amount of solid electrolyte so that a positive electrode is formed on a collector. It is noted that the mixture ratio of these materials can be appropriately adjusted.

It is appropriate for the positive electrode to be formed such that the active material layer thereof has a thickness, for example, from approximately 30 to 100 μm. The form and size of the positive electrode is not particularly limited and a variety of forms such as rectangles including the square, polygons, the circle and the like are possible. Particularly, it is preferable for the positive electrode to have rectangles including the square, polygons. It is noted that it is preferable for the positive electrode to have a collector tab that protrudes from a portion of the positive electrode, for example, from one side of a rectangular form. The size and form of the collector tab are not particularly limited and the width of the tab may be from approximately 5 to 100% of the side of the positive electrode from which the collector tab protrudes.

A known material can be used as the negative electrode and examples thereof include lithium metals, lithium alloys, graphite and the like. In particular, it is preferable to use a graphite material in which carbon having low crystallinity is attached to the surface of the core of graphite having high crystallinity. Generation of a gas on the negative electrode can be suppressed and the decomposition reaction of the electrolytic solution can be suppressed by using such a material, so that the reliability of the battery can be increased. It is preferable for the ratio of the carbon material on the surface to the carbon material in the core to be in a range from 3:97 to 20:80, more preferably, in a range from 3:97 to 15:85. Thereby, generation of a gas can sufficiently be suppressed and a high capacity of the negative electrode can be implemented.

Herein, natural graphite, artificial graphite in a grain type (in a scale type, in a lump type, in a fiber type, in a whisker type, in a sphere type, in a granular type, or the like) and graphitized products such as meso-carbon microbeads, mesophase pitch powder and isotropic pitch powder as well as a combination of two types of these can be used as the graphite having high crystallinity that is used for the core. In addition, it is preferable for the graphite having high crystallinity to have an average interplanar spacing (d002) of the (002) surface of 0.335 to 0.340 nm obtained by means of an X-ray wide angle diffraction method, a thickness (Lc) of the crystallite in the (002) plane direction of 10 nm or more (more preferably 40 nm or more), a thickness (La) of the crystallite in the (110) plane direction of 10 nm or more (more preferably 50 nm or more) and a peak intensity ratio (hereinafter referred to as R value) of 0.5 or less (more preferably 0.4 or less) in the vicinity of 1360 cm$^{-1}$ relative to the peak intensity ratio in the vicinity of 1580 cm$^{-1}$ according to the argon laser Raman spectrum in order for the graphite having high crystallinity to obtain sufficient crystallinity and to obtain a sufficient capacity in the low potential portion (0 to 300 mV according to the potential reference of Li/Li$^+$), which is close to the potential where lithium dissolves and deposits, at the time when carbon having low crystallinity is attached.

Furthermore, it is preferable for the distribution of grain diameters of graphite having high crystallinity that becomes the core to be in a range from approximately 0.1 to 150 μm taking into consideration risk of causing internal short circuiting through holes in the separator of the battery, uniformity of the electrodes and handling properties in the process of manufacturing the electrodes where active material is filled into a high density. This is because the grain diameters of the graphite material powder wherein a carbon material having low crystallinity is attached to the surface of graphite having high crystallinity depends on the grain diameter of the carbon material which is substantially the core; therefore, the grain diameter of the final product is almost prescribed by grain diameter of the core. Herein, the grain diameter indicates the average value of powder grains and the value of 50% of the integration value is defined as the grain diameter in the grain size distribution measured by a laser diffraction type grain size distribution meter.

Examples of the carbon having low crystallinity that is attached to the surface of the graphite having high crystallinity include: carbon obtained by baking the carbon material that can be easily converted to graphite such as tar and pitch at a temperature of approximately 1,500° C. or less; carbon that has been deposited from a vapor phase of a material such as benzene or propane; a baked product of a carbon material that is not easily converted to graphite such as resin (crystallinity is not raised even when baked at a high temperature), and the like.

The method for attaching a carbon material of low crystallinity to the surface of graphite of high crystallinity can be appropriately selected from among methods well known in the art such as a vapor phase method, a liquid phase method and a solid phase method.

Such materials can be mixed with known conductive materials, binding materials, given solid electrolytes and the like and are formed as negative electrodes. It is noted that these mixture ratios can be appropriately adjusted.

It is appropriate for a negative electrode to be formed so that the thickness of the active material becomes for example, approximately 10 to 100 μm. The form and size thereof are not particularly limited but rather, it is possible to make the form thereof be a variety of forms such as square rectangular, polygonal, circular and the like. Herein, it is preferable for the negative electrode to have a collector tab that protrudes from one side of the outer periphery thereof. The size of the collector tab is not particularly limited and the width of the tab may be approximately 5 to 100% of the side that has the protruding collector tab of the negative electrode.

The separator used for the polymer electrolyte, which is retained by the separator, can be formed of, for example, unwoven cloth, woven cloth or micro porous films made of synthetic resin fibers, glass fibers or natural fibers having electrical insulating properties. In particular, unwoven cloth and micro porous film of polyethylene, polypropylene, polyester and the like are preferable from the point of view of quality stability and the like. A function of blocking the connection between the positive lelctrode and negative electrode is added to some of the unwoven cloth and micro porous films made of synthetic resins in the case where the battery emits heat in an abnormal manner and the separator is melted by heat and such unwoven cloth and micro porous can be preferably utilized from the point of view of safety. Though the thickness of the separator is not particularly limited, the separator may have a thickness that can hold a required amount of liquid and can prevent short circuiting between the positive electrode and the negative electrode. A separator having a thickness of approximately 0.01 to 1 mm, for example, can be used and the thickness is preferably approximately 0.02 to 0.05 mm. In addition, it is preferable for the material that forms the separator to have a gas permeability of 1 to 500 sec/cm$^3$ in order to provide strength for maintaining a low resistance inside the battery and for preventing short circuiting inside the battery.

The form and size of the separator are not particularly limited, but rather, the form thereof can be made to be a variety of forms such as square, rectangular, polygonal, circular and the like. In addition, in the case where separators are placed on both sides of the positive electrode, it is preferable for the separators to be partially connected and integrated so as to sandwich the positive electrode. It is noted that the polymer electrolyte is retained by the separator and the size and form of the separator are substantially unchanged even after the polymer electrolyte is retained by the separator.

The polymer electrolyte is obtained by mixing and polymerizing an organic solvent and an organic compound that becomes the framework of the polymer electrolyte.

Examples of the organic solvent used for the polymer electrolyte include: cyclic carbonates such as propylene carbonate, ethylene carbonate, butylene carbonate and the like; chain carbonates such as dimethyl carbonate, diethyl carbonate, ethylmethyl carbonate, dipropyl carbonate and the like; lactones such as γ-butyrolactone, γ-valerolactone and the like; furans such as tetrahydrofuran, 2-methyltetrahydrofuran and the like; ethers such as diethylether, 1,2-dimethoxyethane, 1,2-diethoxyethane, ethoxymethoxyethane, dioxane and the like; dimethylsulfoxide; sulfolane; methylsulfolane; acetonitrile; methylformate; methyl acetate and the like as well as any combinations of two or more of the above substances. Herein, it is preferable for the organic solvent to be an exclusive combination of solvents having high boiling points in order to avoid a problem of solvent vaporization due to a low boiling point in the case where the battery is exposed to a high temperature.

From the above described point of view, examples of the organic solvent include organic solvents such as a mixture of propylene carbonate (PC) and ethylene carbonate (EC), a mixture of PC, EC and γ-butyrolactone, a mixture of PC and γ-butyrolactone, a mixture of EC and γ-butyrolactone; organic solvents wherein vinylene carbonate is additionally mixed into each of the above organic solvents; organic solvents such as a mixture of PC and vinylene carbonate, a mixture of EC and vinylene carbonate, a mixture of γ-butyrolactone and vinylene carbonate. In particular, a mixed solvent of γ-butyrolactone and EC, a mixed solvent of γ-butyrolactone, EC and vinylene carbonate are preferably used. It becomes possible to suppress gas generation due to vaporization of a component in the electrolytic solution in the case where the battery is exposed to a high temperature by selecting such a liquid composition. Herein, ratios in a range from 95:5 to 5:95 can be used for the two types of solvents mixed together in the case where any of the above described mixed solvents is used and, in particular, it is preferable for γ-butyrolactone to be 95 to 5% of the entirety in the case wherein γ-butyrolactone is mixed and furthermore, it is preferable for vinylene carbonate to be of approximately 5%, more preferably in a range from 0.5 to 3% and most preferably in a range from 1 to 3%, of the entirety in the case where vinylene carbonate is mixed. Concretely, it is appropriate for the ratio of γ-butyrolactone to ethylene carbonate to be of approximately 95:5 to 30:70. In particular, it becomes possible to further suppress gas generation by using a combination of the above described compositions of the electrolytic solution and the above described material wherein low crystalline carbon is attached to the surface of high crystalline graphite. In addition, such a combination making a gel electrolyte has a load characteristic and a low temperature performance similar to those of a lithium ion battery using a liquid electrolyte; therefore, a secondary effect is obtained wherein a polymer battery having a high performance in addition to a high reliability can be achieved.

An electrolytic salt is usually dissolved into the organic solvent so that the organic solvent is used in an electrolytic solution.

Examples of the electrolytic salt include lithium salts such as lithium boron fluoride ($LiBF_4$), lithium phosphorous fluoride ($LiPF_6$), lithium trifluoromethane sulfonic acid ($LiCF_3SO_3$), lithium trifluoroacetate ($LiCF_3COO$), and lithium trifluoromethane sulfonic acid imide ($LiN(CF_3SO_2)_2$) and the like. They can be used solely or in a combination of two or more types of these salts.

A polymerizing monomer that may be used as a material for a chemical crosslinking type solid electrolyte can be used as the organic compound. Such a polymerizing monomer has an affinity with the below described electrolytic solvent and is not particularly limited as long as it is a compound having a functional group that allows for polymerization. Examples of the polymerizing monomer include compounds having polyether structures, compounds having polyether structures and unsaturated double bond groups, oligo-ester acrylate, polyester, polyimine, polythioether, polysulphan and the like, for a sole use or for a use in a combination of two or more types of these compounds. It is noted that compounds having polyether structures and unsaturated double bond groups are preferable because of the affinity with the solvent, particularly, the affinity with the above described solvent having a high boiling point. Examples of the polyether structure unit include ethylene oxide, propylene oxide, buthylene oxide, glycidyl ethers and the like, and a sole use or a use in a combination of two or more types of these compounds may be preferable. Examples of the unsaturated double bond groups include allyl, methacryl, vinyl, acryloyl, methacryloyl and the like. In addition, in the case of a combination of two or more types, the form thereof can be appropriately selected irrelevant of blocks and random and, in particular, acrylate based materials are preferably used and, furthermore, it is preferable to use a mixture of an acrylate based monofunctional monomer and a polyfunctional monomer. In this case, it is preferable for the mixture ratio of the monomer to be as such, polyfunctional monomer: monofunctional monomer is in a range from 4:6 to 9:1. It is more preferable to use a mixture of a polyfunctional acrylate based monomer having a molecular weight of approximately 5,000 to 15,000 and a monofunctional or bifunctional acrylate based monomer having a molecular weight smaller than, preferably of ½ to ⅓ of, that of the selected polyfunctional monomer according to the above described ratio. Thus, an acrylate based material wherein a monofunctional monomer is added to a polyfunctional monomer is preferable because it has strength, elasticity and adhesiveness sufficient to follow changes in the volumes of the electrodes.

As for the ratio of the above described polymerizing monomer to the electrolytic solution, electrolytic solution:monomer=70:30 to 99:1 is preferable and 80:20 to 97:3 is more preferable from the point of view of the performance that is equivalent to that of the electrolyte and retaining properties of the electrolytic solution that does not cause liquid leakage. In particular, it is preferable for the composition ratio of acrylate based monomer to the electrolytic solution to be 3:97 to 30:70 and it is more preferable for the composition ratio of acrylate based monomer to the electrolytic solution to be 3:97 to 10:90. A polymer electrolyte having a sufficient viscosity that can prevent a shit of an electrode can be obtained by using the above described gel composition.

Examples of the method of polymerizing and crosslinking the polymer electrolyte include: a method of irritating the mixture of the organic solvent, the organic compound and the like with light energy such as of ultraviolet ray, election beam, visible light and the like; a method of heating the mixture of the organic solvent and the organic compound, and the like. In particular, it is preferable to carry out a polymerization/crosslinking reaction by means of UV irritation that can shorten the period of time required for polymerization/crosslinking of the polymer electrolyte even in the case of a stacked structure. In the case where a polymerization/crosslinking reaction is carried out by means of a light energy such as of UV, it is preferable to use a separator having a high light transmission rate after a polymer precursor is impregnated into the separator in a manner as described below because the polymerization/crosslinking reaction can proceed efficiently. A polymerization initiating agent can be utilized if necessary at the time when the polymer electrolyte is polymerized or crosslinked. In particular, it is preferable to add a polymerization initiating agent of several % or less in the polymerization or crosslinking method due to an ultraviolet ray or heat application. Optical polymerization initiating agent such as trimethylsilylbenzophenone, benzoin, 2-methylbenzoin, 4-methoxybenzophenone, benzoin methylether anthraquinone, benzyl dimethylketal and the like, benzoylperoxide, methyl ethylketone peroxide, α,α'-azobisisobutyronitrile, and the like are appropriate as the polymerization initiating agent. It is preferable for the irradiated ultraviolet ray to have a wave length from 250 to 360 nm. Herein, it is preferable for the mixture of the organic solvent and the organic compound to be polymerized/crosslinked-after the mixture is placed so that the mixture is integrated to the separator for retaining the polymer electrolyte, preferably to the separator and to the positive electrode, before the polymerization or the crosslinking is carried out. It is preferable for the polymer electrolytes on the positive electrode side and on the negative electrode side to have different components so that the polymer electrolytes most appropriate for the positive electrode and negative electrode can be selected in order to suppress side reactions on the respective electrodes of positive electrode and negative electrode and in order to suppress a gas generation on the respective electrodes of positive electrode and negative electrode. In addition, a change in volume of the negative electrode is particularly great due to charge and discharge reactions; therefore, it is preferable to place a polymer electrolyte on the negative electrode side of the separator, having a viscoelasticity higher than that of the positive electrode side. Herein, the polymer electrolyte in this case may be impregnated into the gaps in the positive electrode and in the negative electrode in addition to those in the separator layer. The viscoelasticity of the gel electrolyte can be controlled by adjusting the ratio of the electrolytic solution to the polymer precursor, the molecular weight of the polymer precursor, the mixture ratio of the monofunctional monomer to the polyfunctional monomer and the like.

It is necessary to select a separator having a high affinity with the polymer precursor in order to sufficiently secure the strength of adhesion in the interface between the polymer electrolyte and the separator so as to prevent a shift between the electrodes and so as to be strong against vibrations and in order to sufficiently secure impregnation of the polymer electrolyte (electrolytic solution). In the case where the polymer precursor is impregnated into the separator, the separator having good wettablity becomes transparent. Accordingly, it can be evaluated or determined whether or not the affinity is high, that is, whether or not the wettablity of the polymer precursor for the separator is good by measuring the light transmission rate of the separator in the case where the polymer precursor is impregnated into the separator. It is preferable to select a separator having a light transmission rate of 50% or more, 55% or more, 60% or more and 65% or more at the time when γ-butyrolactone is impregnated into the separator in order to prevent for example an unreacted monomer from remaining without fail in the case where the polymer precursor and the separator and additionally the positive electrode are polymerized/crosslinked by means of light energy or the like so as to be integrated to each other and so as not to negatively affect the cycle characteristics and the like.

In addition, the micro porous film of polypropylene or polyethylene conventionally does not have a sufficient affinity with the electrolytic solution due to the properties of the material in the case where a solvent having a comparatively high viscosity such as γ-butyrolactone or ethylene carbonate is solely used. Accordingly, it is possible to increase the wettablity of the separator by carrying out a chemical process such as of a surface active agent and the like for controlling the surface structure, a physical process such as a plasma process and the like or a coating process of resin such as polyvinyliden fluoride (PVDF) and the like having high affinity with the polymer precursor on the surface of the separator.

It is preferable for the polymer electrolyte to have high viscosity in the polymer battery. Herein, having high viscosity indicates the exhibition of the viscosity in the case where the surface of the polymer electrolyte is pressed against another surface such that the electrodes have adhesiveness that can retain their own weight in the condition that the positive electrode, the polymer electrolyte and the negative electrode are stacked and it is preferable for the polymer electrolyte to have viscosity higher than such viscosity. Therefore, the viscosity can be appropriately adjusted according to the sizes, weights, and the like of the stacked electrodes. Thus, risk of short circuiting due to a shift of the electrodes during the process after stacking and due to vibrations at the time of utilization of the battery are reduced by using a polymer electrolyte having high viscosity and, thereby, the reliability of the battery can be increased and the size of the separator can be limited to the minimum requirements.

Furthermore, it is preferable to remove factors for lowering the adhesiveness at the time when the stacked electrodes are secured to each other by means of the viscosity of the polymer electrolyte in order to increase vibration-proof properties of the completed battery in the polymer battery. As for such factors, vaporization of a solvent of a low boiling point in the case where the battery exposed to a high temperature, gas generation due to the decomposition of the electrolytic solution resulting from the repetitive utilization (charge and discharge) of the battery, application of stress to the stacked electrodes in the peeling direction due to a gas and the like can be cited. Accordingly, it is effective to adopt a component of the electrolytic solution that does not include the solvent of a low boiling point and to suppress the generation of gas resulting from a side reaction with the electrodes. It is necessary to adopt a positive electrode material, a negative electrode material, a polymer electrolyte and the like which do not easily generate a gas and to select a combination of these materials which do not easily generate a gas from the point of view of a restriction of generation of a gas. This is because, in the case where a gas is locally generated, the interfaces between the polymer electrolytes and the electrodes in this portion is broken down so that a force for peeling the laminate which has been secured by means of the viscosity of the polymer electrolyte is made to be in effect.

The polymer battery of the present embodiment is formed by stacking at least one layer of a positive electrode, a polymer electrolyte retained by one layer of a separator and one layer of a negative electrode.

It is preferable for the polymer battery to be of a thin type in order to effectively use the characteristics of the stacked type and it is preferable for the total thickness of the polymer battery to be 5 mm or less, 3 mm or less and furthermore 2 mm or less. Accordingly, it is appropriate for approximately 1 to 15 layers of the laminates to be stacked wherein each laminate has a positive electrode, a polymer electrolyte and a negative electrode.

In addition, a portion of the outer periphery of the separator and the negative electrode is positioned outside of the outer periphery of the positive electrode or the entirety of the outer periphery of the separator and the negative electrode is positioned outside of the outer periphery of the positive electrode except for the tab of the positive electrode when the positive electrode, the separator and the negative electrode are stacked in the polymer battery of the present invention. Furthermore, it is necessary for the length between the end of the negative electrode to the end of the positive electrode (D1 of FIG. 1) to be greater than the length between the end of the negative electrode and the end of the separator (D2 of FIG. 1) in a portion of the outer periphery of the separator and the negative electrode. That is, it is necessary to set the sizes of respective electrodes in the lithium battery system so that lithium does not deposit on the metal portion (always exposed at the time when the electrodes are cut) of the negative electrode collector which is exposed from the end of the negative electrode because lithium ions released from the positive electrode are inserted between the layers of graphite in the negative electrode. In addition, it is necessary to set the sizes of the respective electrodes so that the electrodes can easily be stacked without the positive electrode projecting from the area of the negative electrode in order to prevent short circuiting. Herein, it is preferable for the portion or the entirety of outer periphery of the separator and the negative electrode to establish such a relationship on a side in the case where the separator and the negative electrode are, for example, in rectangular forms. In this case, the outer peripheries of the positive electrode, the separator and the negative electrode may substantially coincide with each other on other sides or the entirety (except the collector tab portion) of the outer peripheries of the separator and the negative electrode may be positioned outside of the outer periphery of the positive electrode. In particular, in the case where the positive electrode is in a rectangular form provided with a collector tab on one side thereof, it is preferable for the relationship of D1>D2 to be satisfied at least on one side adjacent to the side on which the collector tab is formed and, furthermore, on all of the sides where the collector tab is not formed. Herein, it is appropriate for D1 to be approximately 0.5 to 2 mm, it is appropriate for D2 to be approximately 0 to 1.8 mm, and more preferably approximately 0.1 to 1.8 mm, and in particular it is preferable for D2 to be approximately 10 to 50% of D1 and more preferably to be approximately 20% of D1.

The positive electrode, the separator and the negative electrode are first processed so that the outer periphery of the separator and the negative electrode is positioned outside of the outer periphery of the positive electrode at the time when the positive electrode, the separator and the negative electrode are stacked according to a manufacturing method for a polymer battery of the present technology. Such processes can be carried out according to a method well known in the art. Herein, after the above described processes, the separator and the polymer electrolyte, preferably the separator, the positive electrode and the polymer electrolyte are polymerized/crosslinked so as to be integrated.

Next, the positive electrode, the polymer electrolyte retained by the separator and the negative electrode are stacked. It is necessary to carry out the stacking so that the above described relationship is satisfied and, for example, the positive electrode, the polymer electrolyte retained by the separator and the negative electrode may be stacked on a platform having at least two protrusions on the surface by utilizing these protrusions or the positive electrode and the like may be stacked sequentially while recognizing the end portion (for example, side) of the positive electrode and the like, that is to say the position of the electrodes, by means of optical position detection means.

In the following, a polymer battery and a manufacturing method for the same will be described in detail.

EXAMPLE 1

(Preparation of Positive Electrode)

Lithium cobalt oxide ($LiCoO_2$) was utilized as an active substance of a positive electrode. Polyvinyliden fluoride, which is a bonding material, was first dissolved in a solvent, N-methyl-2-pyrolidone, in a mortar and this was mixed with the active substance of the positive electrode and acetylene black so as to prepare a paste.

The paste obtained in such a manner was applied to a collector of an aluminum foil and this was pressed after carrying out a temporary drying process at 60° C. and a heat treatment at 150° C. The size of the electrode was 62 mm×30 mm (except the tab portion). Furthermore, drying process under reduced pressure was carried out at 180° C. in order to remove the moisture and a positive electrode for testing was formed. The density of the applied filling was 2.9 g/cm³.

(Preparation of Negative Electrode)

Graphite material powder obtained by mixing 80 parts by weight of graphite material powder (grain diameter: 12 μm, d(002)=0.337 nm, R value=0.4, carbon material of low crystallinity/(graphite material powder of high crystallinity+carbon material of low crystallinity)=0.18) wherein carbon of low crystallinity is attached to the surface of artificial graphite (KS25, made by Timcal corporation), which is the core, and 20 parts by weight of graphite material powder (grain diameter: 16 μm, d(002)=0.336 nm, R value=0.21, carbon material of low crystallinity/(graphite material powder of high crystallinity+carbon material of low crystallinity)=0.05) wherein carbon of low crystallinity is attached to the surface of natural graphite (found in Madagascar) which is the core was used as the active substance negative electrode. Polyvinyliden fluoride, which is a bonding material, was dissolved in a solvent, N-methyl-2-pyrolidone, in a mortar and this was mixed with the active substance of the negative electrode so as to prepare a paste.

The paste obtained in such a manner was applied to a copper foil of 20 μm and this was pressed after carrying out a temporary drying process at 60° C. and a heat treatment at 150° C. The size of the electrode was 64 cm×32 cm (except the tab portion). Furthermore, drying process under a vacuum was carried out at 150° C. in order to remove the moisture and a negative electrode for testing was formed. The density of the applied filling was 1.58 g/cm³.

(Preparation of Precursor)

A mixed solvent of 1:1 of ethylene carbonate (EC) and γ-butyrolactone in which 1.8 mol/l of $LiBF_4$ is dissolved was used as the electrolytic solution. A tetrafunctional acrylate monomer having an average molecular weight of 7500 to 9000 that contains a copolymer of polyethylene oxide and polypropylene oxide that becomes a precursor of a polymer electrolyte was mixed with monofunctional acrylate monomer having an average molecular weight of 200 to 300 according to the weight ratio of 7:3. The electrolytic solution and the monomer are mixed with each other according to the ratio of 97:3. Two hundred ppm, relative to the total weight, of a thermal polymerization initiating agent is added to the obtained solution so as to prepare a precursor solution.

(Combination of Electrode and Gel Electrolyte)

A micro porous film made of polyethylene based material of which the surface is processed through the coating of PVDF is used as a separator and was processed to be in a bag form of a size of 64 cm×32 cm. The positive electrode obtained in the above described manner was inserted into the separator so that the distance between the ends of the positive electrode and the ends of the separator becomes 1 mm on the respective sides. The precursor obtained in the above described manner was impregnated into the positive electrode and the separator under the above described condition and extra precursor was removed and, after that, the gel precursor was cured by means of UV. The gel precursor was impregnated into the negative electrode without any separators and, then, the gel precursor was cured in the same manner.

(Preparation of Battery)

Ten positive electrodes 1 and eleven negative electrodes 3 were stacked according to the positional relationship as shown in FIG. 1 such that the sides of positive electrodes 1 having collector tabs 4 and integrated to separators 2 and the opposing sides of negative electrodes 3 having collector tabs 4 coincide with each other. It is noted that D1 in FIG. 1 was 1 mm and D2 was either 0 mm or 0.1 mm. The obtained laminate 6 for the electrode was inserted into an aluminum stacked bag that had been processed into a-bag form, which was sealed under reduced pressure. Thermal polarization was carried out and a polymer batter was prepared. 20 polymer batteries were prepared in the same manner.

(Evaluation of Batteries)

The obtained batteries were repeatedly charged and discharged under the conditions of current value 160 mA, charge 4.2 V-CCCV and discharge 2.75 V-CC and the cycle characteristics were measured. The average value of the energy density (calculated by solely using the electrode size of the negative electrode and the thickness of the battery) per volume of the obtained batteries, the number of batteries of which the energy density was 360 Wh/l or more and the number of batteries of which the capacity maintaining ratio of the $100^{th}$ cycle is 95% or more are shown in table 1.

Herein, it has been confirmed that the electrodes have not shifted during the process after stacking the electrodes due to the viscosity of the above described gel electrolyte.

EXAMPLE 2

A polymer battery was manufactured in the same manner as in Example 1, except for a usage of unwoven cloth made of polyester having a thickness of 35 µm as the separator.

The obtained battery was evaluated in the same manner as in Example 1. The result thereof is shown in Table 1.

COMPARATIVE EXAMPLE 1

An electrode in which an electrode and a gel electrolyte are combined was obtained in the same manner as in Example 1, except for the size of the separator being 66 cm×34 cm (size greater than that of the negative electrode).

The obtained electrode (positive electrode) was carefully stacked on the negative electrode so as to be placed within the area of the negative electrode and this operation was repeated so that a lithium polymer battery having 10 layers of positive electrodes and 11 layers of negative electrodes was prepared. Twenty polymer batteries were manufactured in the same manner and were evaluated in the same manner as in Example 1. The result thereof is shown in Table 1.

COMPARATIVE EXAMPLE 2

A positive electrode and a negative electrode were inserted into a separator in a bag form, wherein the size of the separator was 66 cm×34 cm (size greater than that of the negative electrode). The positive electrode had 2 mm margin around the electrode and the negative electrode had 1 mm margin around the electrode. An electrode in which an electrode and a gel electrolyte are combined was obtained in the same manner as in Example 1, except for the above.

A separator integrated to the obtained positive electrode and a separator integrated to the negative electrode were stacked so that the opposing sides thereof coincided with each other and this operation was repeated so as to obtain a lithium polymer battery having 10 layers of positive electrodes and 11 layers of negative electrodes. Twenty polymer batteries were manufactured in the same manner as described above and were evaluated in the same manner as in Example 1. The result thereof is shown in Table 1.

TABLE 1

| | Average value of energy density (Wh/l) | Number of batteries having 360 Wh/l or more | Number of batteries having capacity maintening ratio of 95% or more |
|---|---|---|---|
| Example 1 | 394 | 20 | 20 |
| Example 2 | 364 | 20 | 19 |
| Comparative Example 1 | 388 | 20 | 16 |
| Comparative Example 2 | 352 | 2 | 19 |

As is clear from Table 1, the lithium polymer batteries of Examples 1 and 2 have high energy densities and exhibit excellent cycle characteristics.

A battery of Comparative Example 1 having insufficient cycle characteristics was taken into pieces, so that a partial shift of the positive electrode was observed and a portion of the positive electrode protruding from the area of the negative electrode was found. When this portion was observed in detail, a portion of an end of the negative electrode wherein lithium had deposited was observed. The cycle characteristics were considered to be poor because of the deposition of dendrite due to a shift of the electrode.

In addition, although no problem with the cycle characteristics arises in Comparative Example 2, separators are utilized for both the positive electrode and negative electrode; therefore, a sufficient energy density was not obtained.

EXAMPLE 3

The batteries manufactured in Example 1 were used and vibration tests were carried out on fully charged batteries. The tests were carried out in the three directions of X, Y and Z under the test conditions that circulating scans were 10 Hz to 55 Hz and vibration time was 30 minutes. After the completion of the tests, the voltage of the batteries was 4.17 V and it was confirmed that no abnormality had occurred to the batteries.

It was found from this result that a stacked type polymer battery using a gel electrolyte having a high viscosity had excellent vibration-proof properties.

COMPARATIVE EXAMPLE 3

A stacked type lithium ion battery was manufactured using electrodes and separators formed in Example 1 and using, in place of the gel electrolyte, a mixed solvent of 1:1 of ethylene carbonate (EC) and γ-butyrolactone in which 1.8 mol/l of $LiBF_4$ had been dissolved.

The same vibration tests as in Example 3 were carried out on the obtained battery.

As a result, the voltage after the tests was found to have been lowered to 4.06 V when the voltage before the tests was 4.18 V. The battery was taken into pieces and, as a result, it was found that the laminate of the electrodes had been slightly shifted and it was considered that microscopic short circuiting had occurred in end portions of the electrodes due to the vibrations.

EXAMPLE 4

Figure 2:
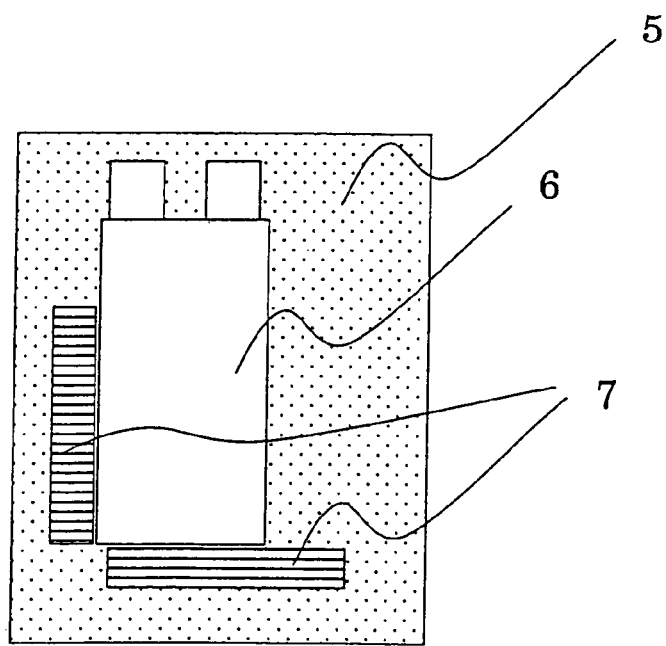
FIG. 2 is a schematic plan view of a main portion for describing the step of stacking the positive electrode, the polymer electrolyte retained by the separator and the negative electrode at the time of manufacturing a polymer battery according to an example embodiment.

A stacked type battery was manufactured using an electrode laminate 6 wherein the size of the positive electrode is 62 mm×30 mm, the size of the separators integrated to the both sides of the positive electrode is 64 mm×32 mm and the size of the negative electrode is 64 mm×32 mm as well as using, for positioning, a stacking device having a simple stacking stage 5 with protrusions 7 perpendicular to each other as shown in FIG. 2.

Usage of this device made it possible to easily position electrode laminate 6 integrated to the electrodes and to the separators with high precision through a simple operation of pressing electrode laminate 6 against protrusions 7 positioning in the longitudinal and lateral directions.

In addition, a stacked type battery was manufactured using an electrode of a different size (the size of the positive electrode is 62 mm×62 mm, the size of the separators integrated to the two sides of the positive electrode is 64 mm×64 mm and the size of the negative electrode is 64 mm×64 mm) as well as using the same device as described above and, as a result, it was confirmed that stacking was possible without any changes in the device.

According to the present technology, it be comes possible to laminate positive electrodes and negative electrodes in precise positions in the case where a laminate is formed. In addition, the shifts of the electrodes can be limited to the minimum after stacking and it becomes possible to increase the reliability against vibrations at the time utilization of the battery.

In addition, in the case where a positive electrode is provided with polymer electrolytes respectively retained by separators on the two sides of the positive electrode and the separators are neutrally connected through at least a portion, it becomes possible to easily position the positive electrode within the area of the negative electrode by overlapping the negative electrode with the positive electrode covered with the separators and, thereby, shifts of the separators can be prevented and short circuiting between the positive electrode and the negative electrode, can be prevented without fail.

Furthermore, according to the present technology, a positive electrode, a polymer electrolyte and a negative electrode can be stacked without fail regardless the sizes of electrodes and, in addition, stacking of the electrodes and the like becomes possible without changing the manufacturing units according to a simple method such as mechanization even when the sizes of the electrodes and the like are changed. Accordingly, it becomes possible to sufficiently utilize the characteristics inherent to polymer batteries such that the freedom of the forms is high being applicable to a variety of forms.

In addition, shifts of the electrodes can be suppressed after stacking by adopting a way of stacking of electrodes such that a positive electrode and a separator are stacked on a negative electrode after a positive electrode and a separator are integrated; a usage of a gel having a high viscosity; and usage of materials and a combination of materials from which gases are hardly generated. Accordingly shifts of electrodes due to vibrations at the time of utilization of the battery can be prevented, so that short circuiting between a positive electrode and a negative electrode can be prevented and it becomes possible to further increase the reliability.

In addition, shifts of the electrodes can be suppressed after stacking by adopting a way of stacking of electrodes such that a positive electrode and a separator are stacked on a negative electrode after a positive electrode and a separator are integrated; a usage of a gel having a high viscosity; and usage of materials and a combination of materials from which gases are hardly generated and, thereby, shifts of electrodes due to vibrations at the time of utilization of the battery can be prevented, so that short circuiting between a positive electrode and a negative electrode can be prevented and it becomes possible to further increase the reliability.

What is claimed is:

1. A polymer battery comprising:
   at least one layer of a positive electrode, the positive electrode being in thin film form and comprising a positive active material layer formed on a positive electrode collector;
   at least one layer of a separator retaining a polymer electrolyte; and
   at least one layer of a negative electrode, the negative electrode being in thin film form and comprising a carbon material as an active substance;
   wherein an entirety of the outer peripheries of the separator and of the negative electrode is positioned outside of an outer periphery of the positive electrode except for a collector tab provided to the positive electrode so as to protrude from one side of the positive electrode;
   wherein an outer periphery of the separator is positioned outside of an outer periphery of the positive electrode, and an outer periphery of the negative electrode is positioned outside of the outer periphery of the separator; and
   wherein a distance D1 between an end of the negative electrode and an end of the positive electrode is greater than a distance D2 between the end of the negative electrode and an end of the separator; and
   wherein the positive electrode, the negative electrode, and the separator which retain a polymer electrolyte have adhesiveness for retaining their own weight.

2. The polymer battery according to claim 1, wherein a size of the positive electrode and a size of the negative electrode are chosen whereby lithium does not deposit on a metal portion of a negative electrode collector which is exposed from the end of the negative electrode.

3. A stacked type polymer battery comprising:
   at least one layer of a positive electrode;
   at least one layer of a separator retaining a polymer electrolyte; and
   at least one layer of a negative electrode, each of which is in a thin film form, stacked flat in this order;
   wherein the positive electrode comprises a positive active material layer formed on a positive electrode collector;
   wherein the negative electrode comprises a carbon material as an active substance;
   wherein an entirety of the outer peripheries of the separator and of the negative electrode is positioned outside of an outer periphery of the positive electrode except for a collector tab provided to the positive electrode so as to protrude from one side of the positive electrode;
   wherein an outer periphery of the separator is positioned outside of an outer periphery of the positive electrode and an outer periphery of the negative electrode is positioned outside of the outer periphery of the separator; and
   wherein a distance D1 between an end of the negative electrode and an end of the positive electrode is greater than a distance D2 between the end of the negative electrode and an end of the separator; and
   wherein the positive electrode, negative electrode, and the separator which retain a polymer electrolyte have adhesiveness for retaining their own weight.

4. The stacked type polymer battery according to claim 3, wherein a size of the positive electrode and a size of the negative electrode are chosen whereby lithium does not deposit on a metal portion of a negative electrode collector which is exposed from the end of the negative electrode.

5. The polymer battery according to claim 1, wherein D1>D2, and wherein D1 is approximately 0.5 to 2 mm and D2 is approximately 0 to 1.8 mm.

6. The polymer battery according to claim 1, wherein the positive electrode is provided with the separator retaining the polymer electrolyte on both sides thereof, and the separator and the positive electrode are integrated with each other.

7. The polymer battery according to claim 1, wherein at least the negative electrode has a collector tab that protrudes from one side of the outer periphery thereof.

8. The polymer battery according to claim 3, wherein D1>D2, and wherein D1 is approximately 0.5 to 2 mm and D2 is approximately 0 to 1.8 mm.

9. The polymer battery according to claim 3, wherein the positive electrode is provided with the separator retaining the polymer electrolyte on both sides thereof, and the separator and the positive electrode are integrated with each other.

10. The polymer battery according to claim 1, wherein viscosity of the polymer electrolyte is selected to impart to adhesiveness whereby the electrodes retain their weight in a stacked arrangement of the layers.

11. The polymer battery according to claim 1, wherein viscosity of the polymer electrolyte is selected whereby the electrodes have adhesiveness for retaining weight of the respective electrodes in a stacked arrangement of the layers.

12. The polymer battery according to claim 1, wherein the separator comprises a negative electrode side and a positive electrode side, and wherein a polymer electrolyte on the negative electrode side of the separator has a higher viscoelasticity than a polymer electrolyte on the positive electrode side of the separator.

13. The polymer battery according to claim 5, wherein D2 is approximately 0.1 to 1.8 mm and is approximately 10 to 50% of D1.

14. The polymer battery according to claim 13, wherein D2 is approximately 20% of D1.

15. The polymer battery according to claim 8, wherein D2 is approximately 0.1 to 1.8 mm and is approximately 10 to 50% of D1.

16. The polymer battery according to claim 15, wherein D2 is approximately 20% of D1.

* * * * *